(12) United States Patent
Noik et al.

(10) Patent No.: US 6,332,920 B1
(45) Date of Patent: *Dec. 25, 2001

(54) SLAG FOR CEMENTING A WELL, IN PARTICULAR AN OIL WELL

(75) Inventors: Christine Noik, Le Pecq; Alain Rivereau, Rueil Malmaison; Christian Vernet, Jouy-Mauvoisin, all of (FR)

(73) Assignees: Bouygues, Saint Quentin en Yvelines; Institut Francais du Petrole, Rueil Malmaison Cedex, both of (FR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/341,097
(22) PCT Filed: Nov. 2, 1998
(86) PCT No.: PCT/FR98/02339
§ 371 Date: Aug. 9, 1999
§ 102(e) Date: Aug. 9, 1999
(87) PCT Pub. No.: WO99/23046
PCT Pub. Date: May 14, 1999

(30) Foreign Application Priority Data

Nov. 3, 1997 (FR) .................................................. 97 13796

(51) Int. Cl.$^7$ .................................................. C04B 14/04
(52) U.S. Cl. ............................................ 106/692; 106/737
(58) Field of Search .................................. 106/692, 714, 106/737

(56) References Cited

U.S. PATENT DOCUMENTS

| | | |
|---|---|---|
| 4,501,830 | 2/1985 | Miller et al. . |
| 4,935,060 * | 6/1990 | Dingsoyr et al. .................. 106/719 |
| 5,073,197 * | 12/1991 | Majumdar et al. .................. 106/692 |
| 5,125,455 * | 6/1992 | Harris et al. ........................ 106/737 |
| 5,522,926 * | 6/1996 | Richard et al. ..................... 106/737 |
| 5,531,823 * | 7/1996 | Breton ................................. 106/737 |
| 5,769,939 * | 6/1998 | Dingsoyr et al. .................... 106/737 |
| 5,820,670 * | 10/1998 | Chatterji et al. ..................... 106/727 |
| 5,968,257 * | 10/1999 | Ahrens ................................ 106/737 |
| 5,976,240 * | 11/1999 | Vezza .................................. 106/694 |

FOREIGN PATENT DOCUMENTS

| | | |
|---|---|---|
| 898398 * | 3/1984 | (BE) . |
| 291 075 * | 6/1991 | (DE) . |
| 518177 * | 12/1992 | (EP) . |
| 0 518 777 | 12/1992 | (EP) . |
| 2673620 * | 9/1992 | (FR) . |
| 04104926 * | 4/1992 | (JP) . |
| 279524 * | 12/1998 | (SK) . |
| WO 90/11977 | 10/1990 | (WO) . |

OTHER PUBLICATIONS

"Effect of Microsilica additives on the errosion resistance of reinforcing steel in concrete", Stepanova et al., Beton Zhelezobeton (Moscow) 1993, (5), p 28–30.*

R. L. Dillenbeck, et al., "The Effect Of Microsilica On The Thermal Stability Fo Lightweight Cement Systems", Annual Spe/CIM Petrol Soc. Horiz. Wells Conference, No. 116, pp. 1–5 1999. XP–002044825.

E. B. Nelson, "Portland Cements Characterized, Evaluated", Oil and Gas Journal, vol. 81, No. 5, Feb. 7, 1993, pp. 73–77. XP–000142872.

* cited by examiner

*Primary Examiner*—Paul Marcantoni
(74) *Attorney, Agent, or Firm*—Oblon, Spivak, McClelland, Maier & Neustadt, P.C.

(57) ABSTRACT

The invention concerns the cementation of a well.

A slag is used which comprises a hydraulic binder, a microsilica, a mineral addition, a superplasticizing agent and water, under defined granulometry and percentage conditions. The solublefigure relates to three compositions according to the invention but which differ by the origin of the microsilica.

The invention applies notably to the cementation of an oil well.

35 Claims, 2 Drawing Sheets

SLAG FOR CEMENTING A WELL, IN PARTICULAR AN OIL WELL

TECHNICAL FIELD

The present invention concerns a cementation slag for a well, notably a well for exploration or exploitation of underground deposits, such as hydrocarbon or geothermal deposits.

Well cementations are highly specific operations requiring the injection of a cement slag through pipes (casing or tubing) by pumping from the surface. One of the primary aims of these operations is to cement the annular space between the outside of the casing and the borehole. Other cementation operations, well known to persons skilled in the art, may also be concerned, for example the installation of plugs or "squeeze" operations. The well, the internal space and annular space, is filled with a fluid, generally the drilling fluid from the preceding drilling phase, or with a fluid of closely-related composition. The cement slag must be installed in the annular space by circulation while driving the original annular fluid to the surface. The Principal functions of petroleum cement slags are notably to provide sealing of the annular space against the fluids contained in the rocks, gas, oil or Water, and to mechanically hold the pipes in the borehole. For this, the compression resistance characteristic is of prime importance.

In view of the installation of the slag by circulation, controlling the rheology is also very important, as well as the capability of using additives adapted to particular conditions, for example filtrate reducing agents, retarding or accelerating agents, dispersing agents, antifoaming agents, or agents for making lighter or heavier.

PRIOR ART

The current formulations of a cement slag for oil well cementation include an amount of water of the order of 45% of the weight of the cement, which considerably limits the mechanical properties of the hardened slag, notably its compression resistance.

Moreover, cement formulations are known which lead to greatly superior mechanical properties, as described for example in European patent EP 0 518 777, but which are not suitable as well cementation slag, if only because of their insufficient proportion of water.

DESCRIPTION OF THE INVENTION

The problem consequently arises of defining an optimized slag composition whose rheology is suitable for the cementation of an oil well or similar, which has an amount of water significantly less than that of the slags recommended until now for this application, and which, after hardening, has mechanical characteristics greatly superior to those of the cementation slags of the prior art.

These results are obtained, according to the invention, with a slag which has:
- a hydraulic binder of the group constituted by the Class G (API) Portland cements, the Class H (API) Portland cements and the other hydraulic binders with a small a laminate content,
- a microsilica of granulometry in the range 0.1 to 0.50 micrometers, in a proportion of 20 to 35% by weight in relation to the hydraulic binder,
- an addition of medium particles, mineral and/or organic, of granulometry in the range 0.5–200 micrometers, in a proportion of 20 to 35% by weight in relation to the hydraulic binder, the amount of the said addition of medium particles being less than or equal to the amount of microsilica,
- a water-soluble superplasticizing and/or liquefying agent in a proportion of between 1% and 3% by weight in relation to the hydraulic binder, and
- an amount of water equal at most to 30% of the weight of the hydraulic binder.

Preferably, for a given composition, the amount of water is slightly greater than that which is just sufficient to fill the gaps between the grains of the composition, so as to provide the essential rheology.

In preferred embodiments, the slag composition of the invention also has one or more of the following characteristics:
- the hydraulic binder is a Class G Portland cement.
- the hydraulic binder is composed of particles whose sizes are distributed in the range of 0.1–100 micrometers.
- the hydraulic binder is composed of particles whose sizes are distributed in the range of 10 to 50 micrometers.
- the microsilica is a silica ash coming from the zirconium industry.
- no microsilica is present in a proportion of 20–30% by weight in relation to the hydraulic binder.
- the microsilica is present in a proportion of 20 to 25%, by weight in relation to the hydraulic binder.
- the microsilica is composed of a conglomerate of particles whose mean size is close to 3 micrometers.
- the addition of medium particles is an organic addition of balls of plastic material, for example polystyrene.
- the addition of medium particles is a mineral addition chosen among silica, clay, glass balls, metallic salts, barite, haematite and ilmenite.
- the addition of medium particles is a mineral addition of siliceous particles.
- the addition of medium particles is present in a proportion of 20 to 30% by weight in relation to the hydraulic binder.
- the addition of medium particles is a mineral addition of silica sand whose particles have sizes distributed in the range of 5–200 micrometers.
- the addition of medium particles is a mineral addition or silica sand whose particles have a mean size close to 50 micrometers.
- the addition of medium particles is a mineral addition of crushed quartz.
- the water-soluble agent is composed of strongly ionized polymer or copolymer derived from sulphonated groups and/or phosphate, phosphonate or carboxylate.
- the water-soluble agent is an agent of the group constituted by naphthalene sulphonate, lignosulfate, melanin and analogues.
- the water-soluble agent is a liquefier containing sulphonated or phosphatized groups.
- the amount of water is preferably in the range of 20–30% of the weight of the hydraulic binder.

BRIEF DESCRIPTION OF THE DRAWINGS

Exemplary embodiments of the invention and comparative tests will be described below, with reference to the figures in the accompanying drawing.

DETAILED DESCRIPTION OF THE EMBODIMENTS

In the following examples, a Portland cement corresponding to the Class G petroleum standards was used. The cement powder, with a very broad granulometric spread (between 0.1 and 100 μm) having a D50 value of around 14 μm and a BET specific surface of around 1 m²/g, has grains of very varied angular forms.

The D50 value represents the particle size below which 50% of the particles have a dimension below this D50 value.

The silica, used as a mineral addition of medium particles, is in the form of crushed quartz and is composed for the most part of silicon oxide, traces of aluminum, iron and potassium. The very angular grains have a granular spread of between 0.5 and 200 μm, preferably between 1 and 150 μm, a D50 value of around 42 μm, and a specific surface measured by BET of 0.46 m²/g.

The microsilica used (Microsilica a) has an amorphous structure; the size of the conglomerates constituting the powder varies from 1 to 50 μm. Observation with a scanning electron microscope shows that the powder grains are composed of associations of spherical elementary particles (0.1 to 2 μm). These particles are amorphous microspheres with a density close to 2.2. The D50 value is 3 μm.

Finally, the superplasticizer is the D80 liquefier (Dowell) which is a sodium polynaphthalenesulphonate containing 40% by mass of dry material and 60% water. This polymer makes it possible to liquefy the mixture and reduce the amount of water used, for the same viscosity. It also acts as a retarding agent.

Thus, the D50 values of the cement, the medium particles of silica type and the microsilica are respectively 14, 42 and 3 μm. It is clear that the three granular products used (cement, addition and microsilica) have particle sizes which are relatively distributed among them in a specific manner in view of their D50 value. There will be no departure from the invention if other particles equivalent in size and function are used.

EXAMPLE 1
Effect of the Source of the Microsilica

Slag compositions are formulated with the three different microsilicas of Table 1 below.

TABLE 1

| microsilica | a | b | c |
| --- | --- | --- | --- |
| Industrial source | Zirconium industry | Silicon industry | Silicon industry |
| Specific surface (BET) | 12–13 m2/g | 10–11 m2/g | 17 m2/g |
| Grain size and form | conglomerates (elementary particles of 0.1–2 μm) | 0.5–2 μm grains | 0.02–0.5 μm small grains |

Figure 1:
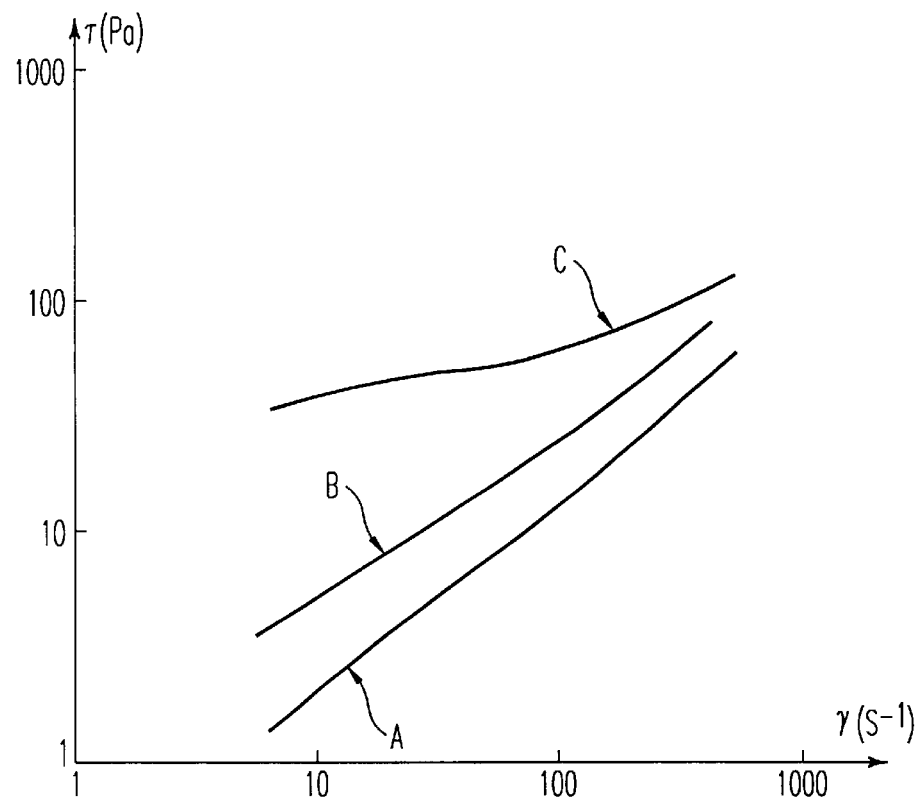
FIG. 1 shows the curves of stresses $\tau$-shearing $\gamma$ at 80° C. of three slag formulations which differ by the microsilica used.

The rheological properties are visible in FIG. 1.

The most favourable viscosity according to the criteria originating from cementation operations on wells is obtained with Microsilica a.

Rheology criterion for a petroleum cement: for an Oswald type flow law ($\tau=K.\gamma^n$) with K close to 0.5 and n close to 1, the equivalent circulation density (ECD) remains lower than the value of 0.5 accepted by the profession.

The equivalent circulation density (ECD) is defined such that the pressure to which the formation is subjected at the time the cement slag is installed remains lower than the reservoir fracturing pressure.

The pumpability times, defined as the time necessary for installation of the cement slag in the well with a minimum of 2 hours, are given in Table 2 below for the 3 formulations, A, B, C.

TABLE 2

| Formulation | A | B | C |
| --- | --- | --- | --- |
| Time | 120 min. | 90 min. | 48 min. |

EXAMPLE II
Choice of Liquefier in Relation to the Microsilica

Preparation is carried out of the following formulations expressed as a % by weight in relation to the cement:

Class G Portland cement: 100 silica (as in Example 1): 20 liquefier: 1.8 total water: 27

Microsilica a: 24

Formulation A: polynaphthalenesulphonate D80 liquefier.

Formulation B: styrene acrylate liquefier

Figure 2:
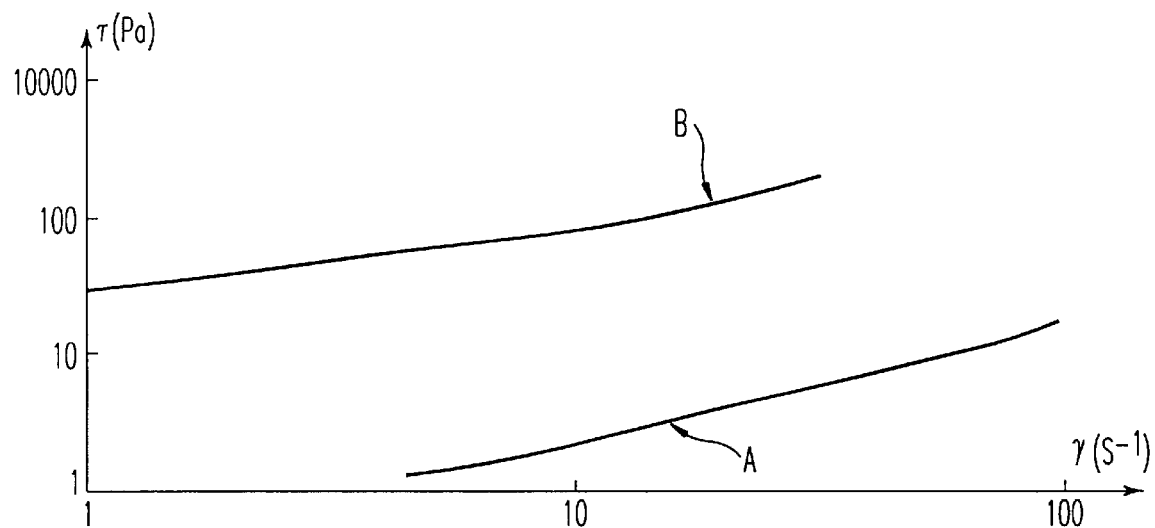
FIG. 2 shows the curves of stresses τ-shearing γ at 80° C. for two slag formulations which differ by the kind of liquefier used.

The viscosity is more favourable with the formulation A liquefier (FIG. 2).

The behaviour of formulation B is due to specific interactions between the acrylate groups liquefier and the microsilica originating from the zirconium industry. It is therefore preferable to formulate, with this type of microsilica, liquefiers containing sulphonated or phosphatized groups and avoid the acrylate groups.

EXAMPLE III
Optimization of the Particle Percentage with Regard to Flow and Head Loss Criteria for Well Cementation The main danger at the time of installation of the cement slag is the generation of pressures greater than the fracturing pressures of the rocks passed through during drilling. The pressures generated by the injection of fluids, in particular cement, through the completion of a well are due to friction. For this type of operation, an important factor is the control of the flow of the cement slag and therefore the knowledge of its rheological behaviour. From a particular choice of operational parameters, the acceptable head and pressure losses are deduced, taking the rheology of the cement slag into account.

The choice of composition is made by optimizing the rheology from a certain fixed amount of water.

Preparation is carried out of the following formulations expressed as a % in relation to the cement:

Class G Portland cement: 100 silica (as in Example 1)

liquefier (as in Example 1): 1.0 total water: 27

Microsilica a:
Formulation A: Microsilica a at 24% and silica at 20%
Formulation B1: Microsilica a at 30% and silica at 20%
Formulation B2: Microsilica a at 35% and silica at 20%
Formulation C1: Microsilica a at 24% and silica at 40%
Formulation C2: Microsilica a at 24% and silica at 60%

Figure 3:
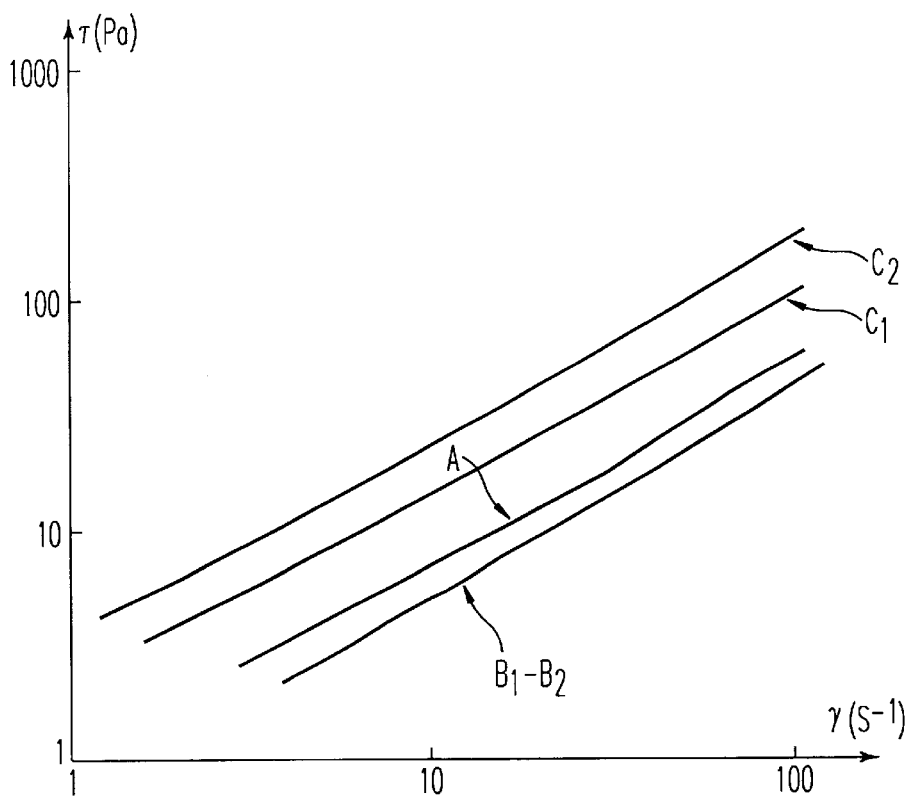
FIG. 3 shows the curves of stresses τ-shearing γ at 20° C. for five slag formulations of different granulomretries.

These formulations provided the results depicted in FIG. 3.

Optimization of fine particles: (A) in comparison with (B1) and (B2).

The more the amount of fines increases, the more the particles can flow by an effect similar to ball bearings and therefore the more fluid the slag is. A limit in improvement of viscosity is reached if the flow curves B1 and B2 are compared. An optimum percentage of fines, between 20 and 35%, is thus determined.

Optimization of medium particles: (A) in comparison with (C1) and (C2).

Similarly, the relative percentage of medium particles compared with fine particles is determined if the flow curves C1 and C2 are compared with respect to that of A.

The formulations C1 and C2 contain more medium particles compared to fine particles (microsilica), and then have a rheology (curves C1 and C2 of FIG. 3) greater than the formulations B1–B2, A, all three which have an amount of medium particles smaller than that of fine particles. Cement slags having a rheology comparable to that of C1 or C2 are poorly suitable, or even unsuitable, for oil well cementation.

In fact, this is confirmed by another test on formulations with the amounts of silica and microsilica assembled in Table 3 below. The results of these tests ($\tau$ in (Pa)) are also given in Table 3.

TABLE 3

| | $\tau$ (Pa) | | | |
|---|---|---|---|---|
| microsilica | 20% | 25% | 30% | 35% |
| 20% silica | 87 | 110 | 120 | 120 |
| 60% silica | 267 | 255 | 257 | 257 |

$\tau$ (Pa) represents the stress values measured for a given shearing of 100 s$^{-1}$. The formulations having stress values lower than 130 Pa are obtained for microsilica/silica ratios at most equal to 1.

In the case of the relatively high microsilica level of 35%, one test gives, for 35% of medium particles, a stress value of the order of 130 Pa which represents a rheology which is sometimes acceptable, but generally borderline.

For the formulations containing 60%, silica and between 20 and 35% microsilica, the shearing stressed are too large for the present application.

For an amount of fines of the order of 24%, an amount of 20% by weight of medium particles gives a good rheology for a conventional well geometry.

Furthermore, the formulation A, which contains water in a water to cement ratio of 0.27, has a compression resistance 3.5 times greater than a conventional cement formulation for wells which contains water in a water to cement ratio greater than 0.4.

EXAMPLE IV

Comparison of the Properties of a Conventional Cement Slag Formulation with a Formulation According to the Present Invention The main properties required for a petroleum cement are listed below. A systematic comparison is carried out between the formulation of the invention A and a conventional petroleum cement (B).

Formulation A expressed as a % in relation to the cement
cement (as in Example 1): 100
silica (as in Example 1): 20
D80 liquefier (as in Example 1): 1.8
total water: 27
Microsilica a: 24
D 121 retarder (Dowell): 0.8
Formulation B expressed as a % in relation to the cement
cement (as in Example 1): 100
S8 silica (Sifraco): 40
Microblock Filler (Halliburton): 14.3
Halad 361 A filtrate reducing agent (Halliburton): 8.5
dispersant: CFR3 (Halliburton): 0.25
HR 15 retarder (Halliburton): 0.7
total water: 44%

Figure 4:
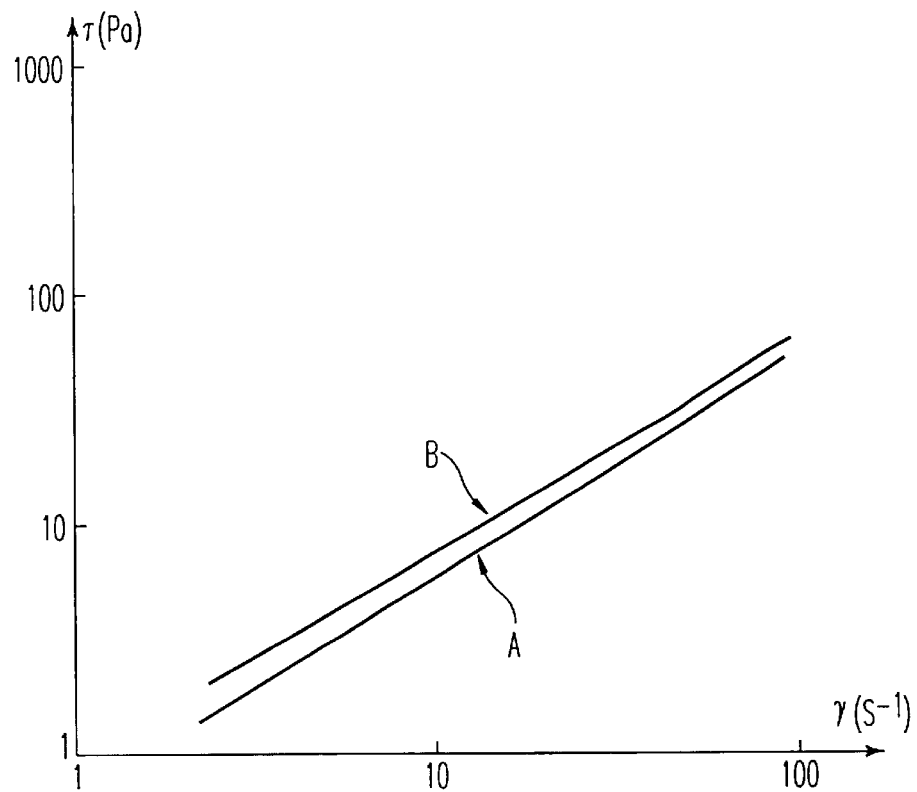
FIG. 4 shows the curves of stresses τ-shearing γ at 20° C. for two slag formulations differing notably by their water content.

FIG. 4 shows a lower viscosity curve for the formulation (A), which limits all the more the head losses in the well.

The compression resistance, the pumpability time, that is to say the time necessary for installation of the slag in the well and for solidification of the slag, and the optimized density for controlling the pressure at the time of partial installation in the case of hot and deep wells, are reported in Table 4 below. This table confirms the performance of the cement slag based on a formulation A notably for the cementation of hot and deep wells.

TABLE 4

| | Compression resistance (MPa) | Pumpability time at 120° C. | Density |
|---|---|---|---|
| Formulation A | 35 | — | 1.9 |
| Formulation B | 172 | 6 h 40 m | 2.3 |

What is claimed is:

1. A cement composition suitable for the cementation of a well, comprising:
   at least one hydraulic binder selected from the group consisting of a Class G (API) Portland cement, and a Class H (API) Portland cement;
   a microsilica of a granulometry in the range of 0.1 to 50 micrometers, in a proportion of 20 to 35% by weight of the hydraulic binder;
   medium particles having a granulometry in the range of 5–200 micrometers consisting of silica sand whose particles have a mean size close to 50 micrometers, in a proportion of 20 to 35% by weight in relation to the hydraulic binder, and wherein an amount of the medium particles is less than or equal to an amount of said microsilica;
   a water-soluble superplasticizing and/or liquefying agent in a proportion of between 1% and 3% by weight in relation to the hydraulic binder; and
   water;
   wherein the amount of water is equal at most to 30% of the weight of the hydraulic binder.

2. The cement composition according to claim 1, wherein the hydraulic binder is a Class G Portland cement.

3. The cement composition according to claim 1, wherein the hydraulic binder is composed of particles whose sizes are distributed in the range of 0.1–100 micrometers.

4. The cement composition according to claim 3, wherein the hydraulic binder is composed of particles whose sizes are distributed in the range of 10 to 50 micrometers.

5. The cement composition according to claim 1, wherein the microsilica is a silica ash coming from the zirconium industry.

6. The cement composition according to claim 1, wherein the microsilica is present in a proportion of 20–30% by weight in relation to the hydraulic binder.

7. The cement composition according to claim 1, wherein the microsilica is present in a proportion of 20 to 25% by weight in relation to the hydraulic binder.

8. The cement composition according to claim 1, wherein the microsilica is composed of a conglomerate and particles having a mean size of about 3 micrometers.

9. The cement composition according to claim 1, wherein the medium particles are present in a proportion of 20 to 30% by weight in relation to the hydraulic binder.

10. The cement composition according to claim 1, wherein the water-soluble agent is composed of strongly ionized polymer or copolymer derived from sulfonated groups and/or phosphate, phosphonate or carboxylate.

11. The cement composition according to claim 1, where the water-soluble agent is an agent selected from the group consisting of naphthalene sulphonate, lignosulphate, melanin and analogs thereof.

12. The cement composition according to claim 1, wherein the water-soluble agent is a liquefier containing sulfonated or phosphatized groups.

13. The cement composition according to claim 1, wherein the amount of water is in the range of 20–30% of the weight of the hydraulic binder.

14. The cement composition according to claim 2, wherein the cement has a D50 value of about 14 $\mu$m.

15. A cement composition suitable for the cementation of a well, consisting essentially of:
   at least one hydraulic binder selected from the group consisting of a Class G (API) Portland cement, and a Class H (API) Portland cement;
   a microsilica of a granulometry in the range of 0.1 to 50 micrometers, in a proportion of 20 to 35% by weight of the hydraulic binder;
   medium particles, which are mineral and/or organic, having a granulometry in the range of 0.5–200 micrometers, in a proportion of 20 to 35% by weight in relation to the hydraulic binder, and wherein an amount of the medium particles is less than or equal to an amount of said microsilica;
   a water-soluble superplasticizing and/or liquefying agent in a proportion of between 1% and 3% by weight in relation to the hydraulic binder; and
   water;
   wherein the amount of water is equal to at most 30% of the weight of the hydraulic binder.

16. The cement composition according to claim 15, wherein the hydraulic binder is a Class G Portland cement.

17. The cement composition according to claim 15, wherein the hydraulic binder is composed of particles whose sizes are distributed in the range of 0.1–100 micrometers.

18. The cement composition according to claim 17, wherein the hydraulic binder is composed of particles whose sizes are distributed in the range of 10 to 50 micrometers.

19. The cement composition according to claim 16, wherein the cement has a D50 value of about 14 $\mu$m.

20. The cement composition according to claim 15, wherein the microsilica is a silica ash coming from the zirconium industry.

21. The cement composition according to claim 15, wherein the microsilica is present in a proportion of 20–30% by weight in relation to the hydraulic binder.

22. The cement composition according to claim 15, wherein the microsilica is present in a proportion of 20 to 25% by weight in relation to the hydraulic binder.

23. The cement composition according to claim 15, wherein the microsilica is composed of a conglomerate and particles having a mean size of about 3 micrometers.

24. The cement composition according to claim 15, wherein the medium particles are introduced as an organic addition of balls of plastic material.

25. The cement composition according to claim 24, wherein which the plastic material is polystyrene.

26. The cement composition according to claim 15, wherein the medium particles are introduced as a mineral addition selected from the group consisting of silica, clay, glass balls, metallic salts, barite, haematite and ilmenite.

27. The cement composition according to claim 15, wherein the medium particles are introduced as a mineral addition of siliceous particles.

28. The cement composition according to claim 15, wherein the medium particles are present in a proportion of 20 to 30% by weight in relation to the hydraulic binder.

29. The cement composition according to claim 15, wherein the medium particles are introduced as a mineral addition of silica sand whose particles have sizes distributed in the range of 5–200 micrometers.

30. The cement composition according to claim 15, wherein the medium particles are introduced as a mineral addition of silica sand whose particles have a mean size of about 50 micrometers.

31. The cement composition according to claim 15, wherein the medium particles are introduced as a mineral addition of crushed quartz.

32. The cement composition according to claim 15, wherein the water-soluble agent is composed of strongly ionized polymer or copolymer derived from sulfonated groups and/or phosphate, phosphonate or carboxylate.

33. The cement composition according to claim 15, where the water-soluble agent is an agent selected from the group consisting of naphthalene sulphonate, lignosulphate, melanin and analogs thereof.

34. The cement composition according to claim 15, wherein the water-soluble agent is a liquefier containing sulfonated or phosphatized groups.

35. The cement composition according to claim 15, wherein the amount of water is in the range of 20–30% of the weight of the hydraulic binder.

* * * * *